United States Patent Office 2,926,171
Patented Feb. 23, 1960

2,926,171

CHEMICAL COMPOUNDS

Harry Louis Yale, New Brunswick, N.J., assignor to Olin Mathieson Chemical Corporation, New York, N.Y., a corporation of Virginia No Drawing. Application October 30, 1956
Serial No. 619,127

5 Claims. (Cl. 260—326.3)

This invention relates to new organic compounds and, more particularly, to mercurated biuret derivatives, useful as diuretics.

The compounds of this invention may be represented by the following structural formula:

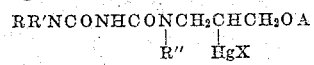

wherein each of R and R' is a member of the class consisting of hydrogen, lower alkyl, aralkyl hydrocarbon of less than eleven carbon atoms, and aryl hydrocarbon of less than eleven carbon atoms, and together with the nitrogen atom represent an N-heterocyclic radical selected from the class consisting of piperidino, piperazino, morpholino and pyrrolidino; A is a member of the class consisting of hydrogen, lower alkyl and aralkyl hydrocarbon of less than eleven carbon atoms; X is a non-toxic anionic radical; and R'' is a member of the class consisting of hydrogen and a second

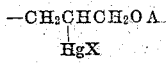

radical. Among the specific members defined by R and R' are lower alkyl radicals, such as methyl, ethyl, propyl, butyl, etc.; aralkyl hydrocarbon radicals of less than eleven carbon atoms, such as benzyl, phenethyl, etc.; and aryl hydrocarbon radicals of less than eleven carbon atoms, such as phenyl, naphthyl, tolyl, xylyl, etc. X in the above formula is a monovalent non-toxic anionic radical and includes inorganic anions (e.g., hydroxyl, halide, sulfate and nitrate) and organic anions such as acyloxy radicals (e.g., alkanoyloxy radicals, such as the acetate, propionate and butyrate radicals; aroyloxy radicals, such as benzoate and naphthoate; and aralkanonyloxy radicals, such as phenacetate and phenylpropionate).

A particularly preferred class of compounds are those of the above formula wherein each of R and R' is hydrogen and A is a lower alkyl radical.

To prepare the compounds of this invention, an allylbiuret of the formula

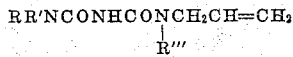

is used as a reactant, R and R' being as hereinbefore defined and R''' being hydrogen or allyl. Suitable allylbiurets include:

allylbiuret;
diallylbiuret;
lower alkyl-substituted allylbiurets (e.g., 5-methyl-1-allylbiuret, 5-ethyl-1-allylbiuret, 5-n-propyl-1-allylbiuret, 5-n-butyl-1-allylbiuret, 5-methyl-1,1-diallylbiuret and 5-ethyl-1,1-diallylbiuret);
di(lower alkyl)-substituted allylbiurets (e.g., 5,5-dimethyl-1-allylbiuret, 5,5-diethyl-1-allylbiuret, 5,5-dimethyl-1,1-diallylbiuret and 5,5-di-n-propyl-1,1-diallylbiuret);
aralkyl-substituted allylbiurets (e.g., 5-benzyl-1-allylbiuret, 5-benzyl-5-methyl-1-allylbiuret, 5-phenethyl-1-allylbiuret and 5-benzyl-1,1-diallylbiuret);
aryl-substituted allylbiurets (e.g., 5-phenyl-1-allylbiuret, 5-naphthyl-1-allylbiuret and 5-phenyl-5-methyl-1,1-diallylbiuret); and
N-heterocyclic carbonylureas (e.g., 3-piperidinoyl-1-allylurea, 3-piperazinoyl-1,1-diallylurea, 3-morpholinoyl-1-allylurea and 3-pyrrolidinoyl-1-allylurea).

The mono- or diallylbiuret is reacted with a mercuric salt, HgB₂, wherein B represents a halide (e.g., chloride and bromide) in water or an alcohol of the formula AOH, wherein A is as hereinbefore defined. Suitable alcohols include the lower alkanols (e.g., methanol, ethanol, n-propanol and n-butanol) and aralkanol hydrocarbons of less than eleven carbon atoms (e.g., benzyl alcohol, phenethanol and phenylpropanol). Although the ratio of reactants is not critical, the mercuric salt is preferably present in about stoichiometric amount, and the water or alcohol is used in excess. A preferred modification of this process is one wherein a mixture of mercuric salts is employed, this mixture comprising a mercuric halide and mercuric acetate present in approximately equivalent amounts.

To convert the halide salt, initially formed, to any other desired salt, the halide is reacted with a silver salt of the desired anion (e.g., silver acetate) in a solvent system wherein both the silver salt of the desired anion and the halide salt of the mercurated biuret are soluble and the silver halide is not (e.g., dilute acetic acid).

The process of this invention is illustrated by the following examples, which are for the purpose of exemplification only and are in no way limiting.

EXAMPLE 1

*1-(2-chloromercuri-3-methoxypropyl)biuret*

A suspension of 15.9 g. (0.05 mole) of mercuric acetate and 13.6 g. (0.05 mole) of mercuric chloride in 150 ml. of methanol is added to a hot solution of 14.3 g. (0.1 mole) of 1-allylbiuret in 100 ml. of methanol. A solid separates directly, but redissolves when the mixture is heated to reflux temperature. The boiling solution is clear for about one hour when, abruptly, a solid begins to separate rapidly. The mixture is refluxed for a total of three hours, cooled and filtered. The filtrate on standing overnight deposits a solid. This solid is filtered and air-dried. It weighs about 7 g., M.P. about 144° C. (dec.), and is recrystallized from 250 cc. of acetonitrile to give 1-(2-chloromercuri-3-methoxypropyl)biuret, M.P. about 153–155° C. (dec.).

*Analysis.*—Calculated for $C_6H_{12}ClN_3O_3Hg$: N, 10.24; Cl, 8.64. Found: N, 10.66; Cl, 8.42.

If 1-(2-chloromercuri-3-methoxypropyl)biuret is treated with water, the salt is hydrolyzed to the basic 1-(2-hydroxymercuri-3-methoxypropyl)biuret.

EXAMPLE 2

*1-(2-acetoxymercuri-3-methoxypropyl)biuret*

To a stirred solution of 4.1 g. of 1-(2-chloromercuri-3-methoxypropyl)biuret in 400 cc. of warm water and 5 cc. of glacial acetic acid is added slowly a solution of 1.67 g. of silver acetate in 200 cc. of water. The mixture is stirred for one hour, the silver chloride filtered off and the filtrate is lyophilized to give about 4 g. of 1-(2-acetoxymercuri-3-methoxypropyl)biuret as a white powder.

EXAMPLE 3

*1-(2-chloromercuri-3-methoxypropyl)-5,5-dimethylbiuret*

To a refluxing suspension of 13.6 g. of mercuric chloride and 15.9 g. of mercuric acetate in 150 ml. of methanol is added a hot solution of 17.6 g. of 1-allyl-5,5-dimethylbiuret in 100 ml. of methanol. The mixture is then refluxed for three hours, cooled and filtered to give 1-(3 - chloromercuri - 2 - methoxypropyl)-5,5-dimethylbiuret in 65% yield. The filtrate is then concentrated to about 100 ml. and cooled overnight. The crystalline product which separates slowly is filtered to give about a 12% yield of 1-(2-chloromercuri-3-methoxypropyl)-5,5-dimethylbiuret.

In a similar manner, by substituting an equivalent amount of 5,5-diethyl-1-allylbiuret, 5-methyl-1-allylbiuret or 5-benzyl-1-allylbiuret for the 5,5-dimethyl-1-allylbiuret in Example 3, the corresponding 5,5-diethyl, 5-methyl and 5-benzyl derivatives, respectively, are produced.

EXAMPLE 4

1-(2-chloromercuri-3-ethoxypropyl)-3-pyrrolidinoylurea

To a refluxing solution of 31.9 g. of mercuric acetate in 150 ml. of ethanol and 5 ml. of acetate acid is added slowly a solution of 19.7 g. of 1-allyl-3-pyrrolidinoylurea. The mixture is refluxed for 18 hours, cooled to about 50° C., stirred and treated dropwise with a solution of 6 g. of sodium chloride in 60 ml. of water. A crystalline product separates directly. This is 1-(3-chloromercuri-2-ethoxypropyl)-3-pyrrolidinoylurea. This is filtered off rapidly and the filtrate chilled to give 1-(2-chloromercuri-3-ethoxypropyl)-3-pyrrolidinoylurea, having the structural formula

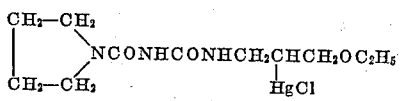

In a similar manner, by substituting an equivalent amount of 1-allyl-3-piperidinoylurea or 1-allyl-3-morpholinoylurea for the 1-allyl-3-pyrrolidinoylurea in Example 4, the corresponding 3-piperidinoyl and 3-morpholinoyl derivatives are obtained, respectively.

EXAMPLE 5

1,1-bis(2-bromomercuri-3-methoxypropyl)biuret

A suspension of 18 g. of mercuric bromide and 15.9 g. of mercuric acetate in 150 ml. of methanol is heated to boiling and a hot solution of 9.15 g. of 1,1-diallylbiuret in 250 ml. of methanol is added all at once. The mixture is refluxed gently for three hours and filtered hot. The insoluble pale yellow solid is 1,1-bis(3-bromomercuri-2-methoxypropyl)biuret. The hot methanol filtrate is allowed to cool spontaneously to 40°, filtered rapidly from a small additional amount of 1,1-bis(3-bromomercuri-2-methoxypropyl)biuret and the filtrate chilled. The crystalline material which separates is recrystallized from water to give 1,1-bis(2-bromomercuri-3-methoxypropyl)-biuret.

In a similar manner, by substituting an equivalent amount of another alcohol, such as ethanol, propanol, butanol and benzyl alcohol, for the methanol in Example 5, the corresponding 3-ethoxy, 3-propoxy, 3-butoxy and 3-benzyloxy derivatives, respectively, are obtained.

If 5,5-dimethyl-1,1-diallylbiuret or 1,1-diallyl-3-pyrrolidinoylurea is substituted for the 1,1-diallylbiuret in Example 5, the corresponding 5,5-dimethylbiuret and 3-pyrrolidinoylurea derivatives, respectively, are obtained.

The invention may be variously otherwise embodied within the scope of the appended claims.

I claim:

1. A compound having the structural formula

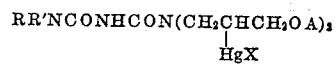

wherein each of R and R' is a member of the class consisting of hydrogen, lower alkyl, aralkyl hydrocarbon of less than eleven carbon atoms, and aryl hydrocarbon of less than eleven carbon atoms, and together with the nitrogen atom represent an N-heterocyclic radical selected from the class consisting of piperidino, piperazino, morpholino and pyrrolidino; A is a member of the class consisting of hydrogen, lower alkyl and aralkyl hydrocarbon of less 11 carbon atoms; and X is a non-toxic anionic radical.

2. 1,1-bis(2-bromomercuri-3-methoxypropyl)biuret.

3. 1-(2 - chloromercuri - 3 - methoxypropyl)-3-pyrrolidinoylurea.

4. 1-(2-chloromercuri-3-ethoxypropyl) - 3 - pyrrolidinoylurea.

5. A compound having the structural formula

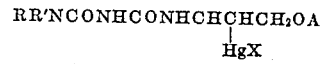

wherein RR'N is an N-heterocyclic radical selected from the class consisting of piperidino, piperazino, morpholino and pyrrolidino; A is a member of the class consisting of hydrogen, lower alkyl and aralkyl hydrocarbon of less than eleven carbon atoms; and X is a non-toxic anionic radical.

References Cited in the file of this patent

UNITED STATES PATENTS

| Number | Name | Date |
|---|---|---|
| 2,592,418 | Halpern | Apr. 8, 1952 |
| 2,635,982 | Rowland | Apr. 21, 1953 |
| 2,636,045 | Halpern | Apr. 21, 1953 |
| 2,792,392 | Freedman et al. | May 14, 1957 |
| 2,880,206 | Werner | Mar. 31, 1959 |

OTHER REFERENCES

J. Am. Chem. Soc., January 1951, vol. 73, pp. 91–93.
J. Am. Chem. Soc., August 1950, vol. 72, pp. 3595–98.
J. Am. Chem. Soc., August 1951, vol. 73, pp. 3691–93.
C. A., vol. 49, p. 6308F, July–Sept. 1949.

UNITED STATES PATENT OFFICE

CERTIFICATE OF CORRECTION

Patent No. 2,926,171                          February 23, 1960

Harry Louis Yale

It is hereby certified that error appears in the printed specification of the above numbered patent requiring correction and that the said Letters Patent should read as corrected below.

Column 3, line 18, for "acetate" read -- acetic --; column 4, line 24, for "of less 11 carbon atoms;" read -- of less than 11 carbon atoms; --.

Signed and sealed this 18th day of October 1960.

(SEAL)
Attest:

KARL H. AXLINE
Attesting Officer

ROBERT C. WATSON
Commissioner of Patents